United States Patent [19]

Irvine

[11] Patent Number: 5,499,698
[45] Date of Patent: Mar. 19, 1996

[54] BICYCLE BRAKE PAD TOE-OUT ADJUSTING TOOL

[76] Inventor: Mark W. Irvine, 55 Bingham Cir., Sacramento, Calif. 95831

[21] Appl. No.: 501,955

[22] Filed: Jul. 13, 1995

[51] Int. Cl.$^6$ ................................. B62L 1/06; F16F 9/00
[52] U.S. Cl. ...................................... 188/24.19; 188/382
[58] Field of Search ................................. 188/24.19, 382, 188/24.11, 24.12; 294/16, 118, 99.2

[56] References Cited

U.S. PATENT DOCUMENTS

| | | | |
|---|---|---|---|
| 3,848,906 | 11/1974 | Fleishman | 294/16 X |
| 4,768,623 | 9/1988 | Nagano | 188/24.12 |
| 5,064,027 | 11/1991 | Akamatsu | 188/24.19 X |
| 5,168,962 | 12/1992 | Yoshigai | 188/24.19 |
| 5,435,611 | 7/1995 | Campbell et al. | 294/16 |

*Primary Examiner*—Robert J. Oberleitner
*Assistant Examiner*—Peter M. Poon

[57] ABSTRACT

A small and portable gaping tool in a first embodiment generally comprising a pivotal or hinge connection between two elongated arm members allowing distal ends of the arms to be pivoted toward and away from one another. A connected spring member biases the distal ends of the arms toward one another. The distal end of each arm includes a pivotally supported shim plate extending perpendicular to the arm. With the arms manually pulled into an open or spread position, the shim plates are located one on each oppositely disposed side of a bicycle wheel, wherein the spring member drawing the arms inward secures the tool in place with clamping frictional pressure. The pivotal aspect of the pivotally attached shim plates allow the shims to adjust to varying slopes of different bike wheel sides so as to lay flat thereagainst. The shims are about three millimeters in thickness for example, and are used to shim out the rearward or toe end of bicycle caliper brake pads in adjusting the pads for proper toe-out. One version of the invention includes a shim plate of proper thickness having a tacky adhesive on at least one side thereof to hold the shim plate temporarily in place between the wheel side and adjacent brake pad to provide the toe-out angle setting, and after the toe-out is secured the adhesively held shim plate is removed.

4 Claims, 9 Drawing Sheets

BICYCLE BRAKE PAD TOE-OUT ADJUSTING TOOL

BACKGROUND OF THE INVENTION

1. Field of the Invention

The present invention relates to bicycle brake adjustment tools and procedures useful in properly setting the pads of cantilever, center pull or side pull caliper style brakes relative to the adjacent wheel of a bicycle.

2. Description of the Prior Art

The most commonly used brakes on bicycles today are caliper brakes which are essentially grouped into three basic category styles including cantilever, center pull and side pull, all of which may be adjusted with the present invention. Caliper brakes are hand actuated from hand levers mounted on the handlebars and connecting with cables which extend downward to pivotally mounted brake arms attached to a stationary frame member and supporting rubbery brake pads having a braking surface facing the side of the wheel. The braking surface of the pads is sufficiently close to the wheel that squeezing of the hand lever draws the cable upward to pivot the end of the brake arms inward about a mounting pivot to have the braking surface of the pads frictionally contact the wheel. Caliper brakes include two brake pads, one on either side of the wheel oppositely disposed from one another and functional in pairs or sets, and with a set of brake arms, one arm per brake pad, and pads on both the rear wheel and front wheel of the bicycle. The pads are manufactured of a semi-rigid rubberized material so as to frictionally grip the wheel when actuated. The brake pads are generally rectangular in shape, being long and narrow in order to provide sufficient surface contact against the normally narrow side of the wheel. The contact or braking surface of the pads typically include a variety of contours or tread patterns to increase frictional adhesion. Caliper brakes function as a vise by clamping against the wheels from both sides to compress the wheel between a pair or a set of brake pads. The compression and frictional contact of the brake pads slow or stop the rotation of the wheels and thus stop or slow the bicycle.

There are common problems associated with caliper brakes when they not adjusted properly, such as squealing, chatter, excessively rapid and uneven wear, and insufficient braking. The squealing, chatter, excessive uneven wear and/or insufficient braking results from improper contact of one or more of the brake pads with the side surface of the wheel. Such problems will even occur with the braking surface of the pad being parallel with the wheel when in the non-actuated or outward position. When the two surfaces (pad braking surface and wheel) are parallel when disengaged, and contact of the pads with the wheel is then made by squeezing the hand lever(s), the rearward end or toe of the pad tends to dig into the wheel first, being pulled slightly under and forward to a small degree by the rolling wheel, and this tends to angle the pad or pads to have the forward end or ends slightly outward away from the wheel, or to hold the front end of the pads off the wheel, typically resulting in pad squeal, chatter, reduced braking, an undesirable wear pattern or all of the above.

A prior art document, U.S. Pat. No. 4,768,623 issued Sep. 6, 1988 to M. Nagano, describes a bicycle cantilever caliper brake of a basic type in wide use today, and for the detailed drawings and description of the brakes and associated mechanical principles, this patent is herein incorporated by reference.

Another prior art document, U.S. Pat. No. 5,168,962 issued Dec. 8, 1992 to K. Yoshigai shows and describes cantilever and side pull caliper bicycle brakes, and for this information to general bike brake mechanics, this patent is herein incorporated by reference. The Yoshigai patent also describes the necessity of proper brake pad adjustment or clearance, further describing the problems associated with improper adjustment or clearance, and this information is another reason for the incorporation of the Yoshigai patent by reference.

Another relevant prior art document is U.S. Pat. No. 5,064,027 issued Nov. 12, 1991 to S. Akamatsu which teaches bicycle caliper brake pads having an extending member which abuts the wheel side surface to semi-automatically initially properly set or adjust the pads relative to the wheel, so that the pads have a small degree of toe-out. The Akamatsu patent also describes the necessity of proper brake pad adjustment or clearance relative to the wheel, and for this information, the Akamatsu patent is herein incorporated by reference.

Although the Yoshigai and Akamatsu patents each detail structuring and instructions for initially properly setting bicycle caliper brake pads relative to the adjacent wheel, it is known that the pads wear with use and can be pulled or slip out of alignment. This wear or misalignment can occur very quickly depending upon riding conditions, and the wear causes the pads to be slightly misshaped, rendering the pads out of proper adjustment and thus less effective at stopping or slowing the bicycle. The worn or out of alignment pads are not only less effective at stopping the bike, but also can make loud annoying noises when applied, such as squealing and chatter. Chatter is also associated with intermittent grabbing of the brakes and vibration.

Depending upon the degree of wear and/or misalignment of the pads, the pads can and should be readjusted periodically so as to set them in proper position relative to the wheel, and this may be necessary as often as once a day depending upon riding conditions. Such proper positioning is with the forward wheel contacting surface of the pads 2 to 4 millimeters nearer the wheel than the rearward end of the pad so that there is a small degree of toe-out, and this so that upon the pads being brought inward to contact the wheel, the front end contacts first, and this causes a small degree of deformation or angular pulling in the flexible pads which helps draw in or slightly pivot the rear end or toe of the pad so that under high clamping pressure, the pad braking surface is fully engaged with the wheel and generally parallel thereto. Improper adjustment such as insufficient toe-out can lead to the forward end of the pads gaping away from the wheel under high clamping pressures wherein only the rearward or toe end of the pads are left contacting the wheel. Alternatively, excessive toe-out can lead to the rear or toe end of the pads not contacting the wheel, and this of course reduces braking. The rear or rearward (toe) end of the pads is the end which the wheel rolls toward, and the front or forward end of the pads is the end which the wheel rolls away from when the bike is rolling forward.

Due to wear and/or misalignment of the pad surfaces which contact the wheel, bicyclist's who desire optimum performance from the brakes will periodically or whenever there are symptoms of wear or misalignment adjust the positioning of the pads so that the pads will be set with a small degree of toe-out, which is with the front ends of the pads 2 to 4 millimeters nearer the wheel side than the rear or toe end of the pads with the pads in the outward away from the wheel position (non-braking). This "toe-out" is only slight in appearance, being 2 to 4 millimeters, but does make a major difference in how the brakes perform. The proper toe-out may be as little as 1 millimeter and more than 4 millimeters depending upon the material flexibility and other characteristics of the pads and support arms. Most bicyclist's adjust the toe-out simply by eye, looking downward to define a slight gap by sight at the rearward end of the brake pad between the wheel side and braking surface of the pad. This procedure using sight is relatively inaccurate by nature, and often results is several trial and error attempts, and the process is normally further complicated by the pad position shifting slightly as the securing nuts and bolts on the brake arm are tightened to secure the pad in a fixed position. Additionally complicating the adjusting procedure is that both pads of a set, i.e., the left side pad and the right side pad should ideally have identical toe-out settings, as the two pads of a set function together to squeeze the wheel, and even pressure on each side of the wheel is ideal.

Additionally, it should be noted that not only should there be a slight amount of toe-out on properly set brake pads, but the elongated planar braking surface of the pads should be angularly tipped to match the typical slope of the wheel surface against which they abut, as normal bike wheels have a side surface which angles slightly inward, being further outward or wider at the major diameter of the wheel and sloping inward toward the wheel hub therefrom.

SUMMARY OF THE INVENTION

The present invention provides a small, lightweight and thus portable gauging or gaping tool for easily properly setting the toe-out angle of caliper type actuated brake pads relative to a bicycle wheel. The present invention not only helps set a proper toe-out, but also helps properly set the angle of the elongated planar braking surface of the pads tipped to match the typical slope of the wheel surface against which they abut. The tool in a first preferred embodiment in accordance with the invention includes a pivotal or hinge connection between two elongated arm members allowing distal ends of the arms to be pivoted toward and away from one another. A connected spring member biases the arms into a closed or toward one another condition. The distal end of each arm includes a pivotally attached shim plate extending perpendicular to the arm. With the arms manually pulled into an open or spread position, the shim plates can be located one on each side of a bicycle wheel, with the arms positioned between the wheel spokes, wherein the spring member drawing the arms inward secures the tool in place with clamping pressure and friction. Since the tool is held in place by clamping pressure, once properly located, the user may use both hands to perform other functions, which is an advantage since the use of two hands renders the adjusting faster and more accurate. The pivotal aspect of the pivotally attached shim plates allow the shims to adjust to varying slopes of different bike wheels so as to lay flat thereagainst to help insure proper toe-out and the proper angular tipping of the braking surfaces of the pads to the slope of the wheel sides. The shims are of a proper thickness, such as between 2 to 4 millimeters for example only, and are used by being located between the wheel side and the rearward or toe end of the brake pad. The shims are structured by either being properly short and of an even thickness, or long and wedge shaped to allow the proper angular setting of the brake pad relative to the wheel, i.e. having a slight toe-out. Both brake pads of a set or pair may be adjusted in a single multi-step procedure since two shims are provided, one on each oppositely disposed side of the wheel and extending from the arms in the same direction. The brake adjustment tool may be used on the brakes of either the front or back wheel of the bicycle.

The self-holding aspect of the tool allows one hand to tighten nuts or bolts for securing the previously loosened pad support arm in place while the other hand holds the pad as stationary as is possible, thus greatly reducing the tendency for the pad to move out of adjustment with the forces associated with twisting of nuts and bolts to lock the pad into the desired setting.

Another version of the toe-out gaping tool in accordance with the invention includes a shim plate of proper thickness having a tacky adhesive on at least one side thereof to hold the shim plate in place between the wheel side and adjacent brake pad to provide the toe-out angle setting, and after the toe-out is secured the adhesively held shim plate is removed. Ideally two of these adhesive possessing shim plates are used simultaneously, one on each opposite side of the wheel so that just like the first embodiment described above, both pads are set in the same basic operation and in a process leaving both hands generally free, one hand to operate a wrenching tool, and the other hand for holding the pad as stationary as is possible during locking of the pad in position.

These, and other advantages and objects of the invention will become more appreciated with continued reading and with a review of the attached drawings.

BEST MODES FOR CARRYING OUT THE INVENTION

The present invention as previously described and as shown in the drawings can be embodied in several structures each providing or allowing for bicycle caliper brake pad accurate toe-out adjusting in a manner wherein the person's hands at a given point in the adjusting procedure are both free, allowing one hand to operate a wrenching tool and the other hand to hold the brake pad in its desired setting while tightening the securing nuts and/or bolts to hold or set the pad as desired, and this is herein defined as "hands free" adjusting. Additionally, each structural embodiment of the present invention is usable or applicable to brake pads which have been in use on the bike, allowing toe-out setting of the pads after wear has occurred to the pads due to use.

In the following detailed descriptions of the numerous structural embodiments in accordance with the invention, like parts or features common to the various embodiment will generally be assigned like numerals in the writing and drawings.

Figure 1:
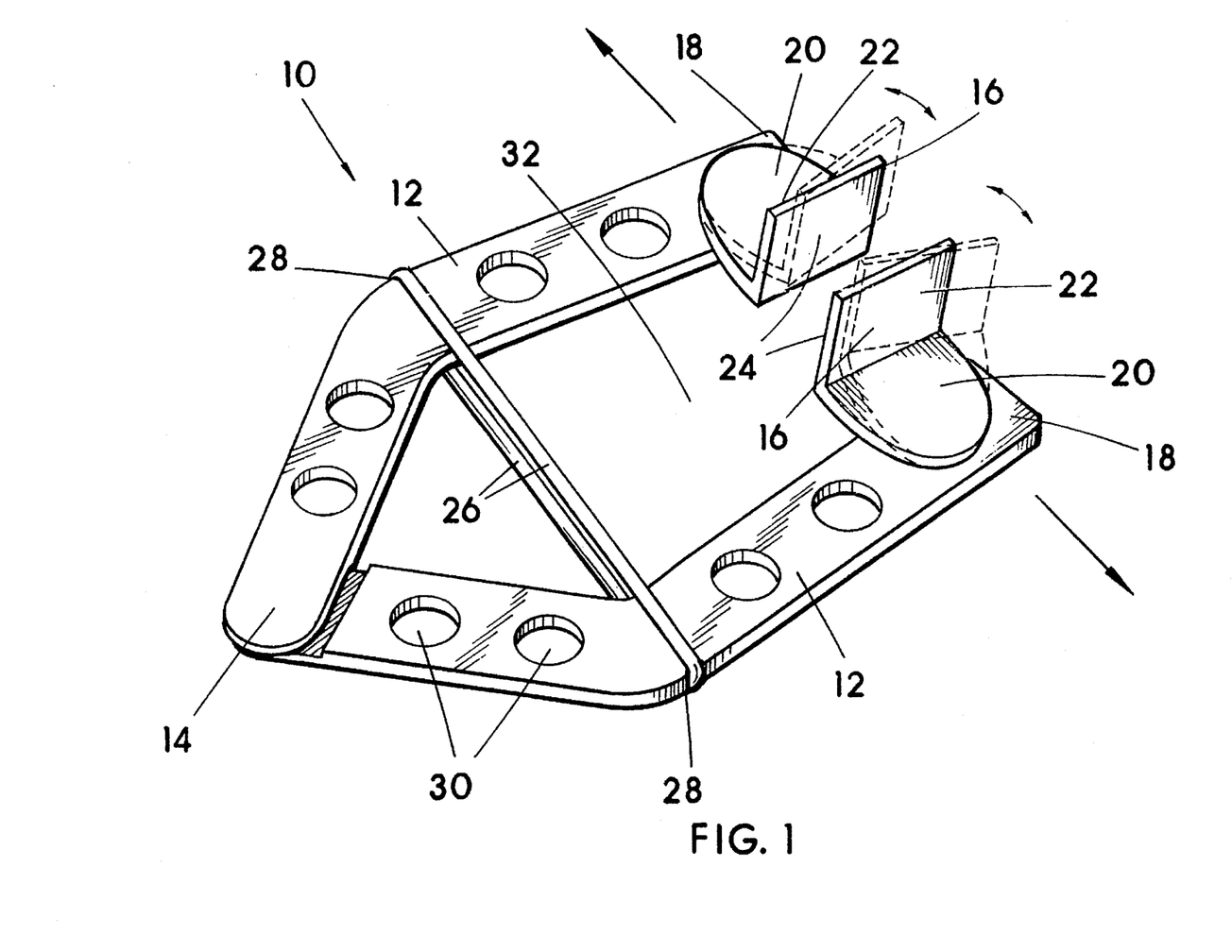
FIG. 1 is a front right perspective view of a first preferred embodiment of the present brake pad gaping tool shown in a partially open position. Shown in broken lines are indication of the pivotal capabilities of the shim plates.
Figure 2:
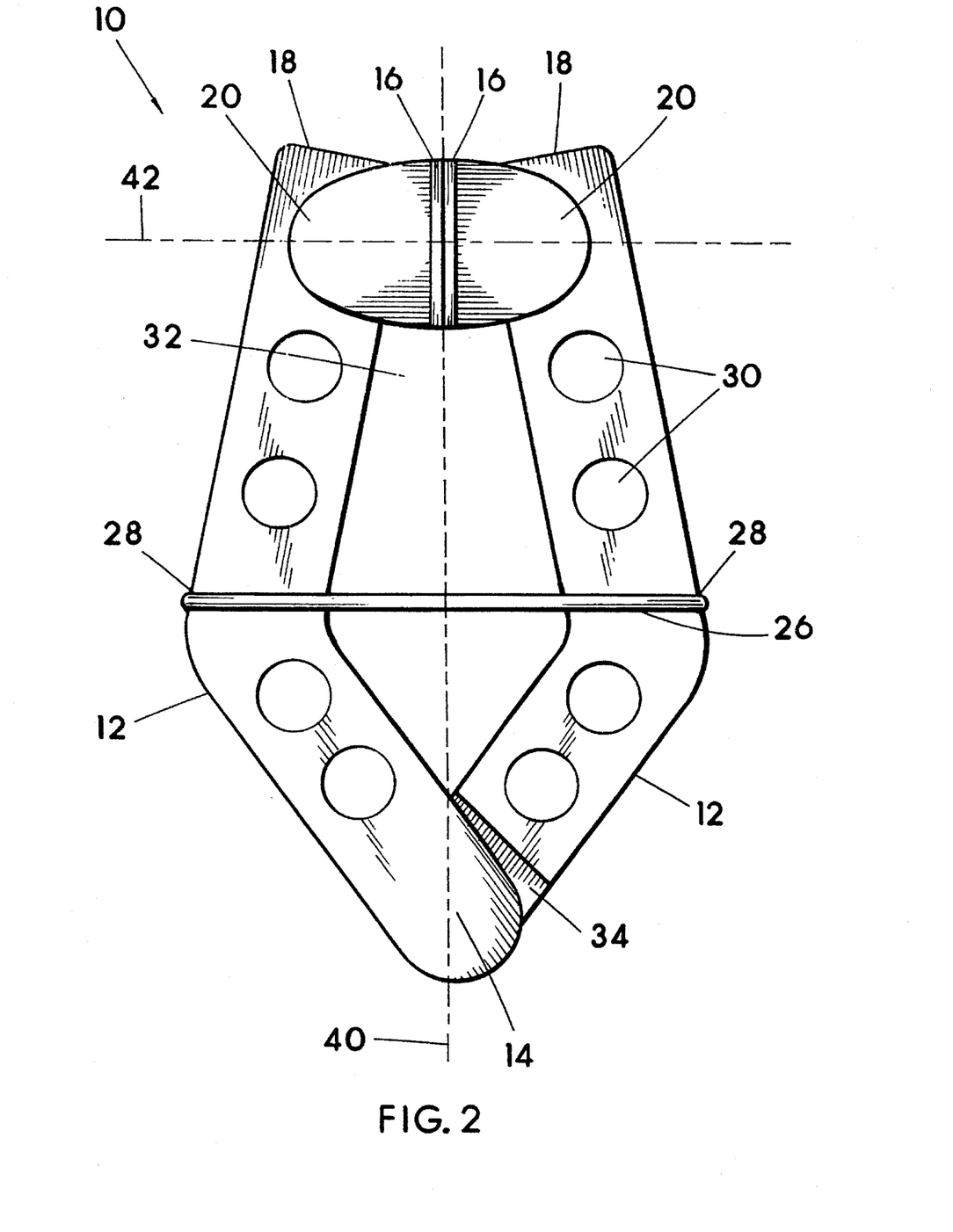
FIG. 2 front plan view of the first preferred embodiment in a fully closed condition.
Figure 3:
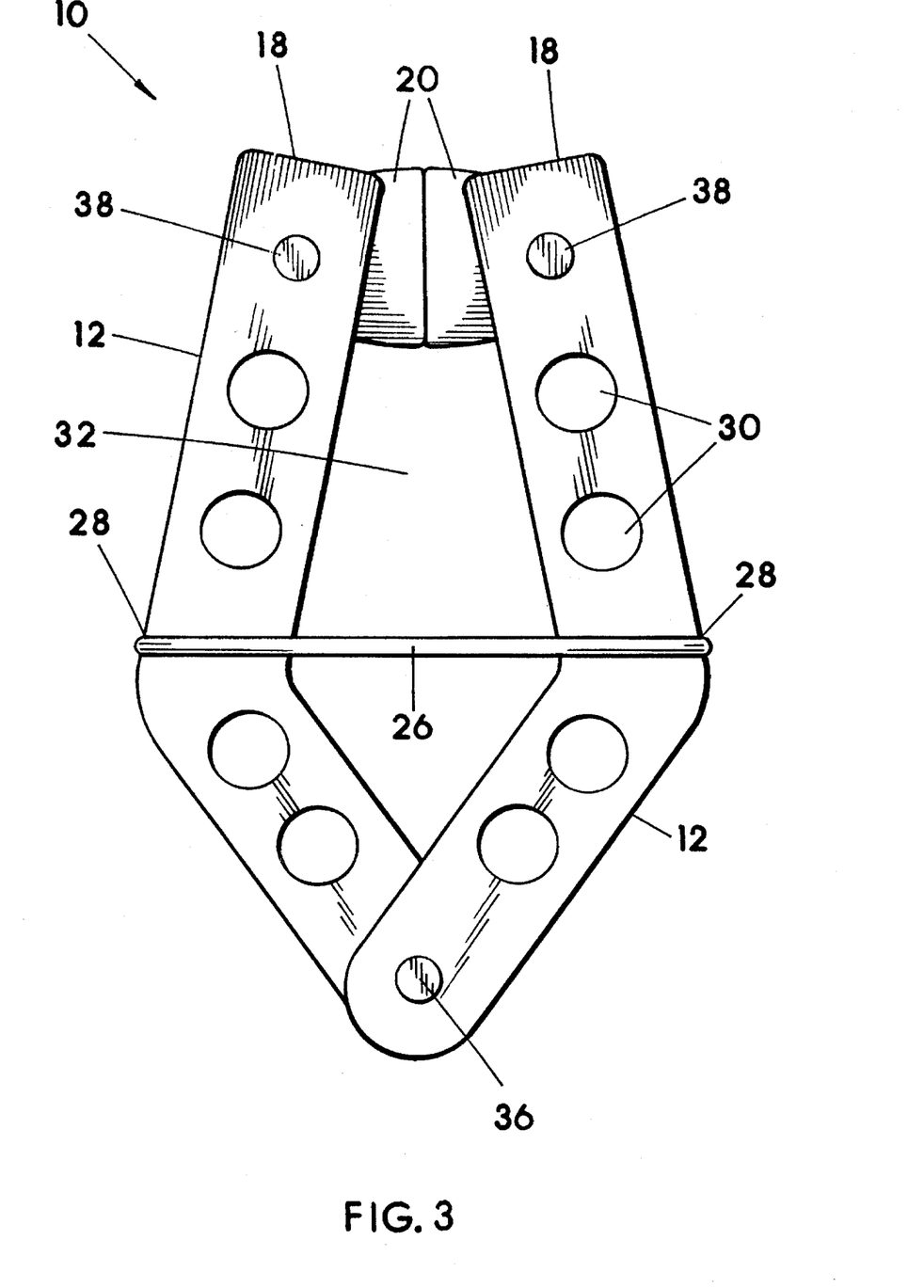
FIG. 3 is a back plan view of the first preferred embodiment in the fully closed condition.
Figure 4:
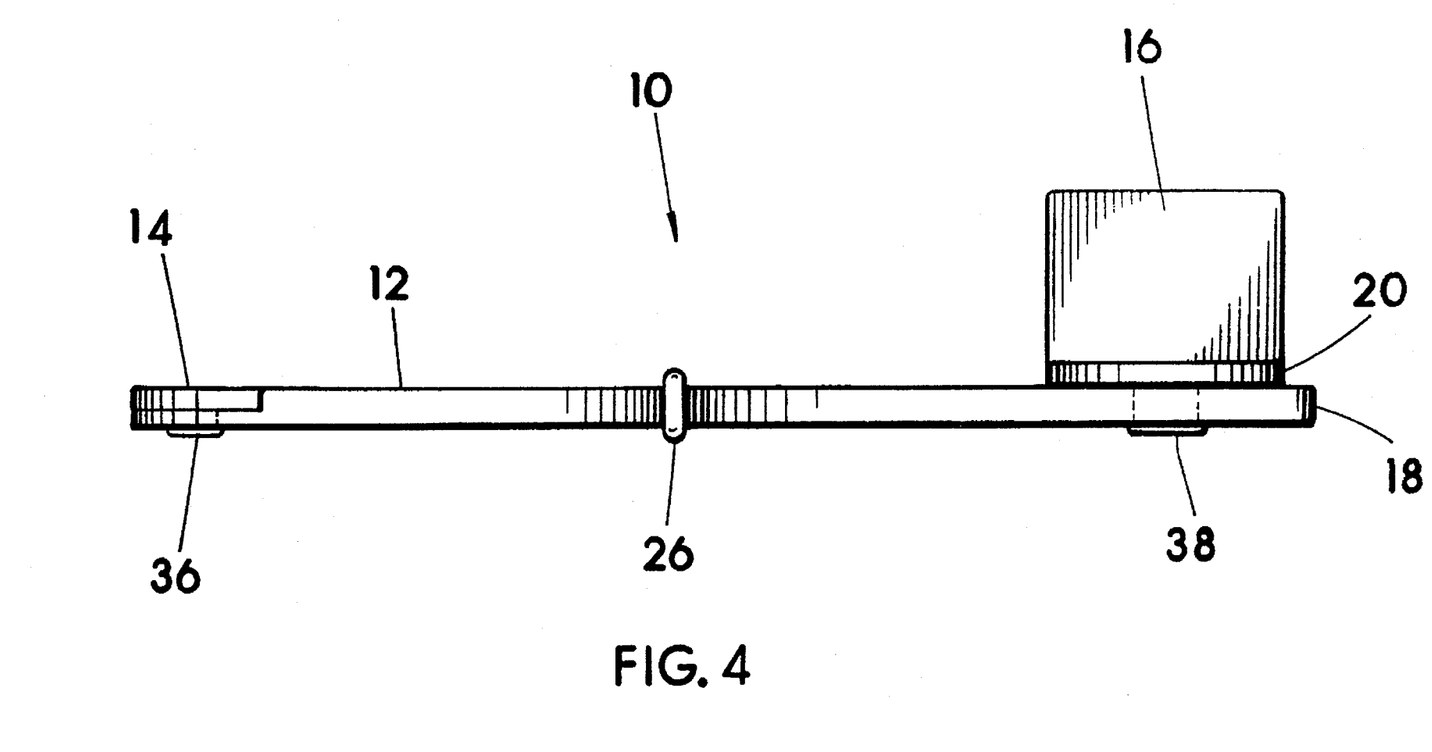
FIG. 4 is a right side view of the first preferred embodiment; the left side view appears as a mirror image thereof.

The first preferred embodiment 10 or tool 10 of the present gaping tool is shown in FIGS. 1–6 and generally comprises two elongated arms 12 connected to one another at the bottom ends thereof at pivotal point 14 by a pivot allowing connector 36 to allow distal ends 18 of the arms 12 to be moved toward and away from one another generally along the toward and away axis 42 shown in broken lines for illustrative purposes in FIG. 2. Connector 36 may be a rivet, a push pin or some other suitable fastener arrangement for keeping the arms 12 connected to one another. In order for the arms 12 to lay in the same plane, a recess 34 thinned area on one or both arms 12 may be included in the area of pivotal point 14. Arms 12 are shown extending from pivotal point 14 slightly outward and then changing angle to angle slightly inward, and this for defining an open interior throat 32 between the arms 12 which allows part of the wheel 68 or possibly the tire 64 to in part rest within the open throat 32. Shown at about the angular change in arms 12 is a rubber band 26 encircling both arms 12 in a manner wherein the band 26 is under tension and the inherent spring nature of the band is drawing the distal ends 18 toward one another. Rubber band 26 is sized so that it is under some tension when tool 10 is in the closed condition as shown in FIG. 2, and is of a strength such that it may bias the distal ends 18 toward the closed position, as will become fully appreciated, to secure shim plates 16 with compression against the sides of wheel 68 allowing the tool to remain in place by itself as will be detailed. Rubber band 26 is retained in position on arms 12 by resting within shallow grooves or notches 28 laterally aligned straight across from one another in the outward sides of arms 12, one notch 28 per arm 12. In the drawings the notches 28 are only about one-half as deep as the diameter of rubber band 26. Rubber band 26 provides biasing of the distal ends 18 toward one another so that shims 16 to be detailed will remain in place against a bicycle wheel 68, and thus other biasing devices such as tension or torsion metal springs could also be used. Arms 12 are shown with multiple holes 30 simply to reduce the weight of the tool, and these are of course optional, although many bicyclist's who may wish to carry this tool while riding are very concerned with weight. Arms 12 may be grasped by hand and pulled into an open position allowing the distal ends thereof to be placed on oppositely disposed sides of wheel 68 wherein the first or connected ends of arms 12 at pivot point 14 are between the wheel 68 spokes (spokes are not shown but are well known), or alternatively pivot point 14 is positioned above the tire 64.

Attached to distal ends 18 are the shim plates 16, one shim plate 16 to each arm 12. Shim plates 16 are preferably pivotally attached to distal ends 18 allowing the shims 16 to automatically pivot to rest flat against the normally sloped sides of wheel 68. Shim plates 16 shown best in FIG. 1 each extend outward at about 90 degrees (perpendicular) from arms 12 and relative to the toward and away movement capability axis 42 (FIG. 2) and each shim plate 16 extends in the same direction allowing both plates 16 to be underneath a rearward end 74 of each of the brake pads 63 of a set of brakes with distal ends 18 further rearward of the pads 63 and generally out of the way. Each of the shim plates 16 includes an inward surface 24 and an oppositely disposed outward surface 22 which are all planar surfaces. Inward surface 24 is for abutment against the side of wheel 68, and outward surface 22 is for abutment against by braking surface 72 of brake pad 63, and specifically the rearward end 74 of braking surface 72 of pad 63. The thickness of each of the shims 16 between inward surface 24 and outward surface 22 is in most conditions good at about 3 millimeters, but could be as little a 1 and as much as 4 millimeters and possibly thicker or thinner, and although the shim plates 16 are shown the same thickness throughout in FIGS. 1 and 2, and as each other for that matter, shims 16 could be wedged shaped being thicker toward connecting plates 20, and thinner toward the distal ends of the shims 16, and this wedged shaped shim would allow the user a degree of choice in how much toe-out was set via sliding the wedge shaped shims 16 further under the rearward ends 74 of the brake pads 63 for increased toe-out, and withdrawing some of the wedge shaped for less toe-out. The size of shim plates 16 can be varied within the scope of the invention, but will function with most bike wheels 68 when some where between 10 and 20 millimeters wide for example only, measuring from distal end 18 toward pivot point 14, and of sufficient upward extension from connecting plate 20 to be positionable under the rearward ends 74 of brake pads 63. Shims 16 in FIG. 1 is drawn from a scale model but at about 3 times scale wherein the shims 16 extend upward or outward from connecting plates 20 about 10 millimeters, and from this one can see the overall tool 10 size is quite small, being capable of fitting into a pocket for easy transportation and storage.

The end of each of the shim plates 16 nearest arms 12 is connected or affixed to the connecting plate 20 laying perpendicular to the extension of plates 16 and parallel to the shown wide flat surfaces of arms 12. Connecting plates 20 serve to hold shim plates 16 position to be more inward than distal ends 18 so that upon application to the sides of wheel 68 the shim plates 16 engage the wheel and are not held-off by distal ends 18. Connecting plates 20 are connected outward from the tool center line longitudinal axis 40 (FIG. 2) to distal ends 18 of arms 12 via pivotal connectors 38 which may be loose rivets or push pins or other suitable connector capable of holding connecting plates 20 on distal ends 18 and allowing connecting plates 20 and thus shim plate 16 to pivot.

Arms 12, connecting plates 20 and shim plates 16 are preferably made of strong rigid materials such as metals or rigid plastics for example, and shim plates 16 should not be compressible to any appreciable degree or at least not to a degree which would lead to false or inaccurate toe-out settings.

Figure 5:
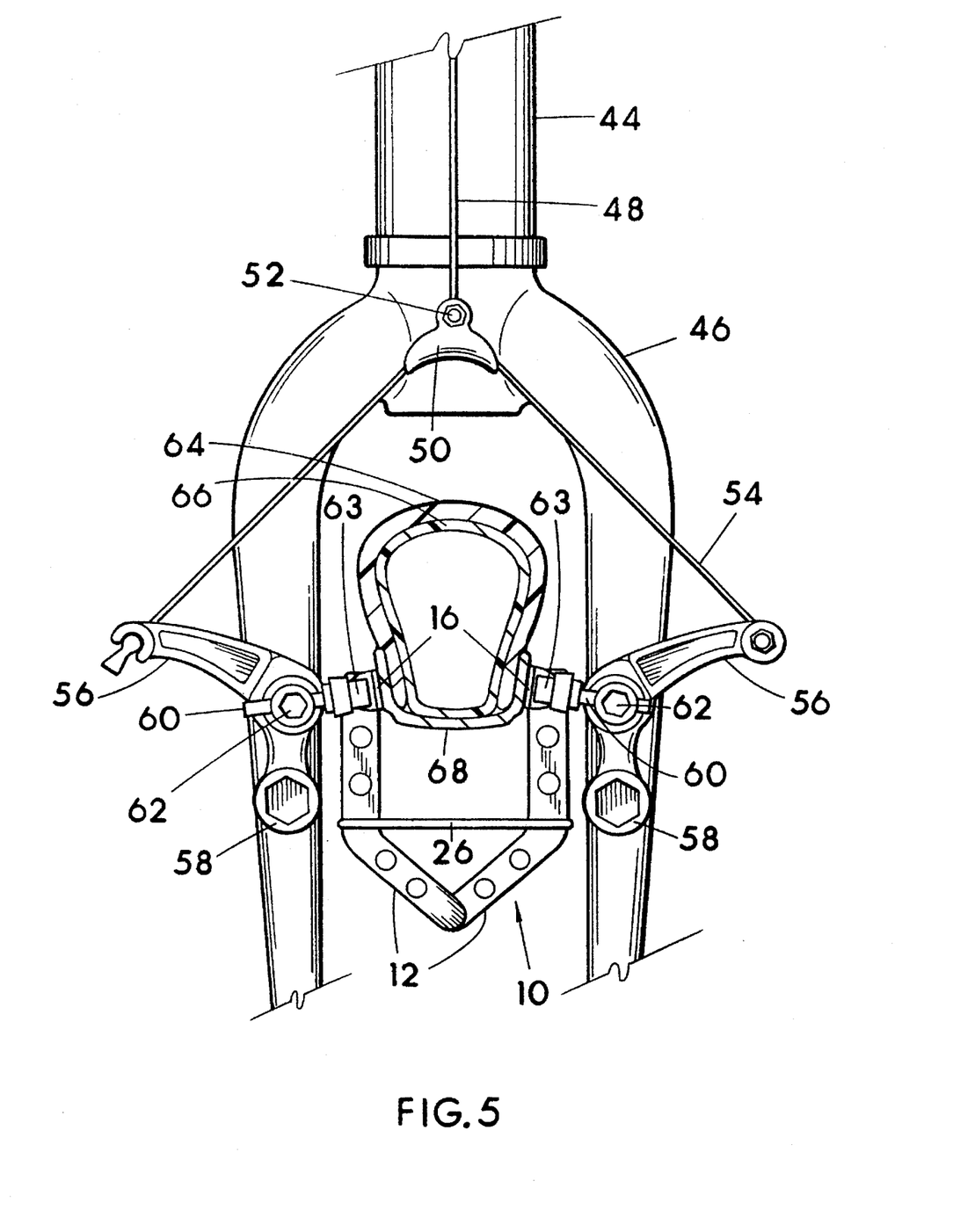
FIG. 5 is an illustration showing a portion of the front forks and head tube of a bicycle; the front wheel, tire and inner tube in cross section; the front caliper brakes and cables, and the first preferred embodiment applied to the wheel sides.
Figure 6:
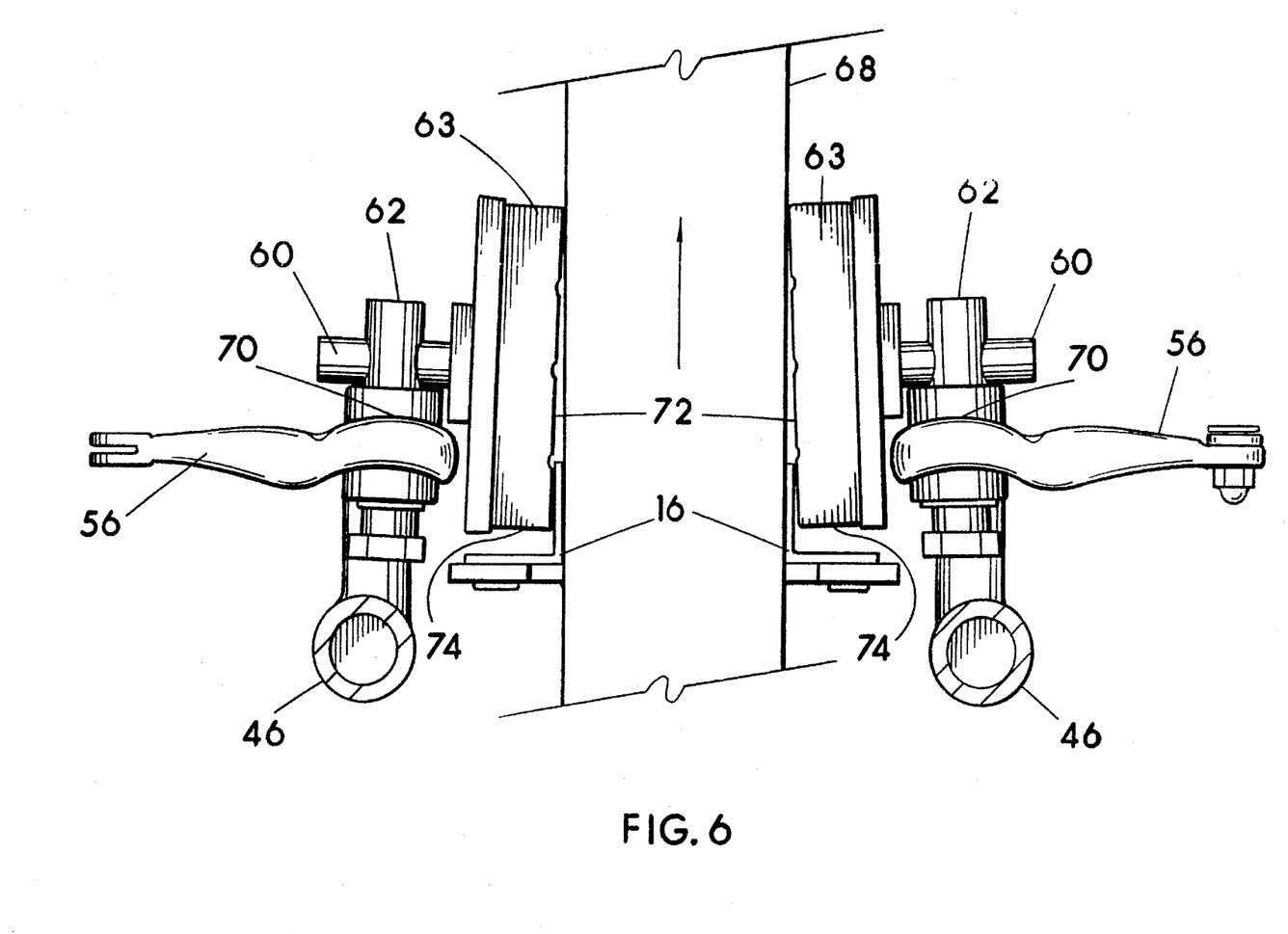
FIG. 6 is a top plan view of the front wheel and brakes showing the shim plates of the first preferred embodiment positioned under the rear or toe end of the brake pads. The brake pads are shown with a degree of toe-out.

With reference primarily to FIGS. 5–6, wherein in FIG. 5 is shown a bicycle head tube 44 connecting to the two front forks 46, the forks 46 having connected thereto cantilever type caliper brake including pivotal bolt attachments at 58 supporting brake arms 56 with pad arm support bolts 62 securing pad support arms 60 which supports brake pads 63 with the braking surfaces 72 facing the oppositely disposed sides of wheel 63. Tire 64 and inner tube 66 are shown on wheel 68. Tool 10 is shown in proper location for adjusting toe-out of the pads 63. The distal ends of the brake arms 56 are shown attached to yoke cable 54 which extends upward to yoke connector 50 which is connected centrally with nut and bolt connector 52 to vertically extending cable 48 which extends to the hand lever (not shown). When the hand lever is depressed, cable 48 is drawn upward pulling yoke cable 54 and pulling upward and inward both brake arms 56 which pivot on connector 58 and bring the braking surfaces 72 of pads 63 into contact with the side of wheel 68. As shown in FIG. 6 and as is known by those skilled in the art, pad support arm holding bolt 62 when tightened renders rod 60 stationary with bolt 62, and when bolt 62 is loosened rod 60 may be slid through the aperture in bolt 62 to be moved closer or further from heel 63 which equates to moving pad 63 closer or further from wheel 68. With modern widely used cantilever brakes, a curve washer abuts a curved surface on brake arm 56 at 70, and with bolt 62 loosened, the angular approach of rod 60 may be changed and then affixed with the re-tightening of bolt 62.

One process to utilize tool 10 is to grasp arms 12 in hand and pull the tool open, spreading shim plates 16 and then slipping the tool between the spokes of wheel 68 wherein the planar inward surface 24 (FIG. 5) of each of the shim plates 16 are abutted against oppositely disposed sides of wheel 68 and positioned under the rearward end 74 of braking surface 72 of pad 63 as shown in FIGS. 5 and 6. The pivotal aspect of shim plates 16 will allow them to automatically conform to the slight slope of the side of wheel 16 under the inward compression of rubber band 26. Cable 48 should then be drawn upward or tightened, and this may be accomplished at nut and bolt 52, or at the cable adjusting nut on the handlebar hand levers, or simply by squeezing the hand lever down and affixing down such as with tape so that the brake pads 63 are brought into engage with wheel 68 and the rearward end 74 of the braking surfaces engage outer surface 22 of shims 16. Bolt 62 should then be loosened and any necessary angular or rotation adjustments via movement at point 70 should be made so the pads 63 will fully engage wheel 68 sides. As shown in FIG. 6, the wheel 68 rotation with the bicycle rolling forward is in the direction of the arrow on the wheel. It can also be seen shim plates 16 will be holding the rearward ends 74 of pads 63 with a slight yet proper toe-out. At this point, bolts 62 may be tightened using a wrench in one hand and hold pad 63 stationary with the other hand. One side bolt 62 is tightened at a time. Tool 10 may now be removed, and the cable 48 may be loosened which by spring biasing inherent in the brake arms the pads 63 will move outward from the sides of the wheel 68. The distance outward from wheel 68 at which pads 63 rest should not be so wide that squeezing of the hand levers will not bring the pads 63 into firm engagement with the sides of wheel 68 for stopping the brakes, but should be sufficient that the pads 63 are not contacting the side of the wheel when in the outward position.

Figure 7:
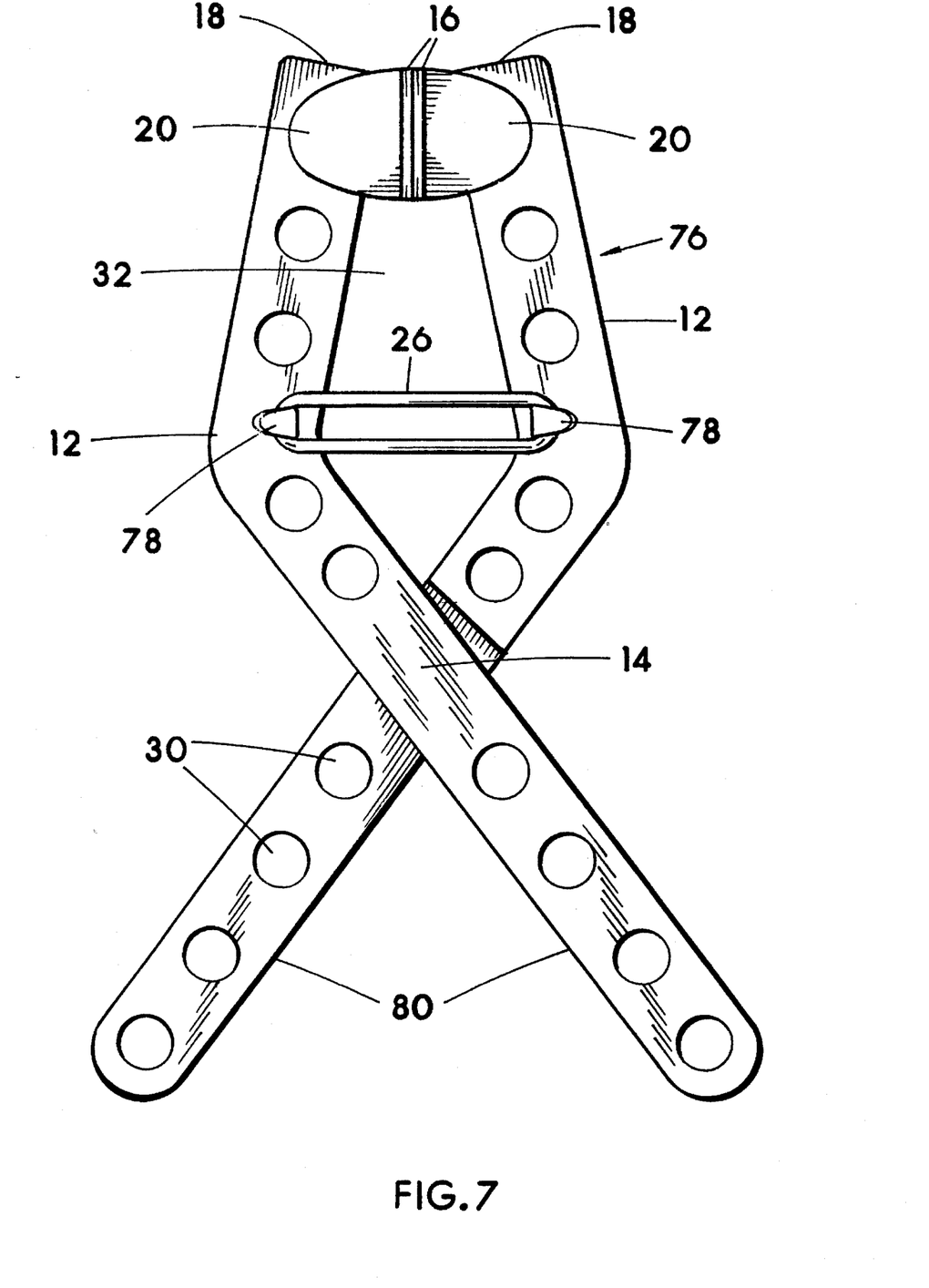
FIG. 7 is a front plan view of a second preferred embodiment of the gaping tool.

With reference now to FIG. 7 wherein embodiment or tool 76 is shown. Tool 76 is essentially identical to tool 10 in use and structure, with the structural difference being arms 12 being extended downward below pivot point 14 so as to define handles 80 which may be squeezed together with one hand to separate shims 16 wide enough to apply to the sides of wheel 68. Additionally, rubber band 26 is shown hooked onto upwardly outwardly extending tabs 78, one tab 78 on each arm 12 positioned between pivot point 14 and shim plates 16.

Figure 8:
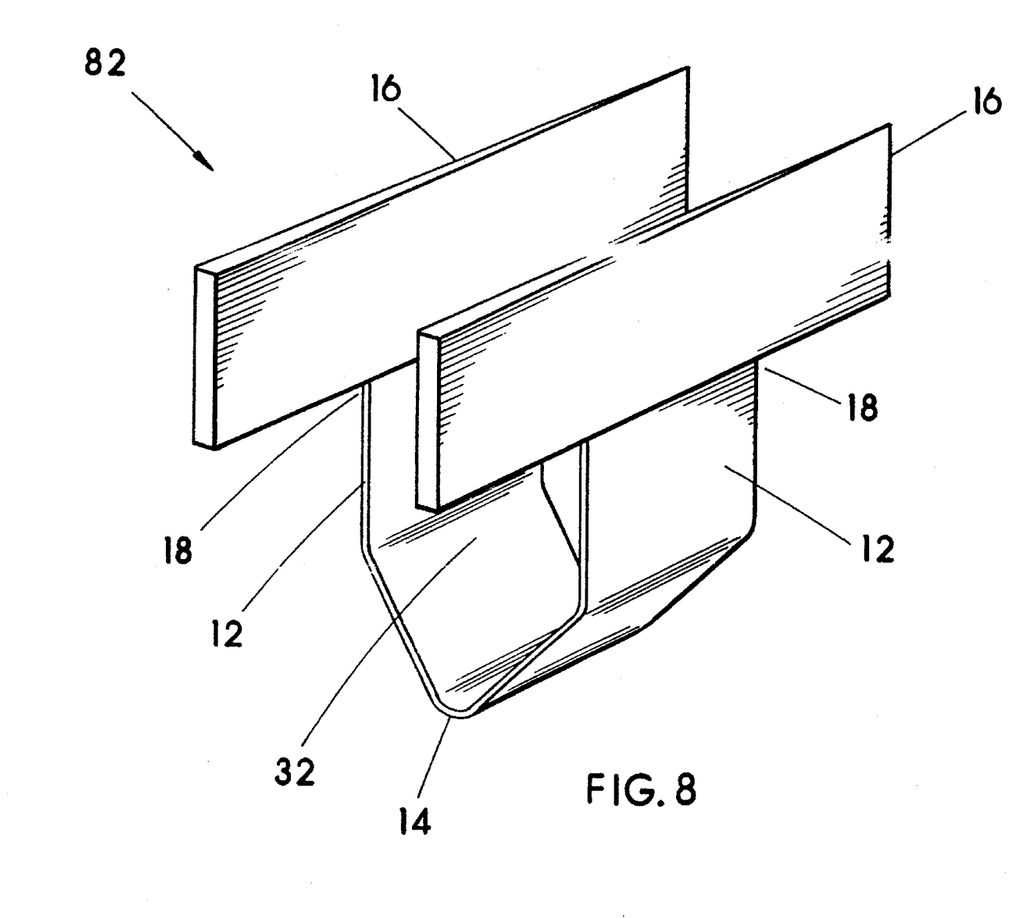
FIG. 8 is a right perspective view of a third preferred embodiment of the gaping tool within the scope of the present invention.

With reference now to FIG. 8 wherein embodiment or tool 82 is shown and wherein arms 12 and pivotal point 14 are integrally formed of spring metal or resilient plastics allowing distal end 18 and wedge shaped shim 16 to be spread.

The normal or resting position between shims 16 is less than the width between the side of wheel 68, and thus the tool when spread and applied to the wheel will retain itself in place. An open throat 32 is also defined between arms 12. Shim plates 16 in this embodiment are wedged shaped and quite long, allowing the user thereof accurately and easily set the degree of toe-out desired. The connection of shim plates 16 to the distal end 18 or arms 12 is preferably either bent at an angle during manufacturing to fit the slight slope of a particular brand of wheel 68, or if the tool 82 is made of metal, the user can bend the shim 16 rest angle at the connection to distal ends 18 to have the inward surface of the shims which abutt the wheel sides lay flat thereagainst.

Figures 9, 10:
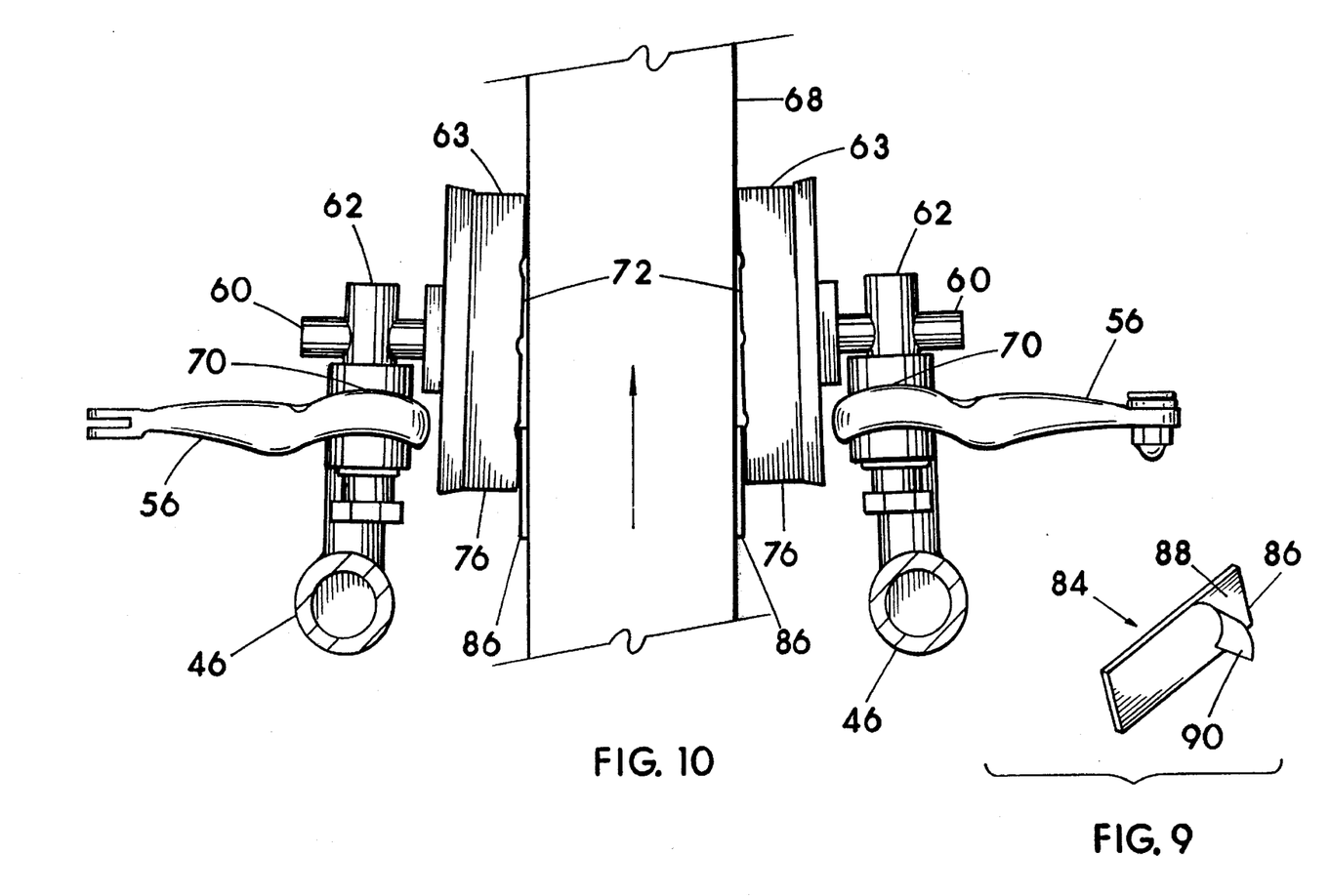
FIG. 9 is a perspective view of a forth preferred embodiment of the present invention.
FIG. 10 is a top plan view of the front wheel and brakes showing the shim plates of the forth preferred embodiment of FIG. 9 positioned under the rear or toe end of the brake pads. The brake pads are shown with a degree of toe-out.

With reference now to FIGS. 9 and 10 wherein embodiment or tool 84 is shown and generally comprises a thin rectangular plate 86 made of metal or plastic which is generally non-compressible at least not to such a degree as to not allow for accurate toe-out setting. Plate 86, and two plates 86 are best used at once are slipped between the rearward end 74 of the braking surface 72 of pad 63 and the side of wheel 63, one plate 86 on each oppositely disposed side of wheel 63. In order to make this embodiment "hand free" a tacky adhesive 88 is applied in the manufacturing thereof to at least one side thereof, and a flexible film cover 90 is applied over the tacky adhesive 88 to protect the glue until use. The cover 90 is a peel off cover which is removed to expose the adhesive 88, and the adhesive side is then stuck onto the rearward end 74 of the braking surface 72 of pad 63 prior to bring the pads inward by tightening the cables 48, 54 and making the toe-out setting essentially as described above. Alternatively, the adhesive side may be applied to the side of the wheel 68. After the adjusting has been made, the shim plate 86 is removed, simply being pulled off since the adhesive is low tack. This embodiment will be very inexpensive to manufacture, and could be disposed of after use.

Although I have very specifically described the preferred structures and use of the invention, it should be understood that some changes in the specific structures described and shown in my drawings may clearly be made without departing from the true scope of the invention in accordance with the appended claims.

What I claim as my invention is:

1. A gaping tool for use in setting toe-out angle of a pair of brake pads relative to an adjacent wheel of a bicycle intended to be stopped by the brake pads, comprising;

a first arm member and a second arm member each having a distal end and being hingidly affixed to one another for retaining said arm members together and for allowing the distal ends of the arm members to be capable of being moved directionally toward and away from one another;

a first shim plate supported on the distal end of said first arm member; said first shim plate having an inward facing surface for abutment against a first side of the bicycle wheel, said first shim plate further having an outward facing surface oppositely disposed from said inward facing surface for abutment against by a braking surface of a first brake pad of the pair of brake pads;

a second shim plate supported on the distal end of said second arm member; said second shim plate having an inward facing surface for abutment against a second side of the bicycle wheel oppositely disposed from said first side of the bicycle wheel, said second shim plate further having an outward facing surface oppositely disposed from said inward facing surface of said second shim plate for abutment against by a braking surface of a second brake pad of the pair of brake pads;

the first and second shim plates each extending outward from the respective supporting distal ends of the arm members and in generally the same direction as one another wherein the outward extension of the shim plates is generally perpendicular to the toward and away directional movement capabilities of the arm members;

the first and second shim plates each having a thickness defined between the inward and outward facing surfaces thereof sufficient for abutting the respective brake pads against the outward facing surfaces of the shim plates with the inward facing surfaces of the shim plates simultaneously against the respective opposite sides of the bicycle wheel wherein toe-out setting of the brake pads is made by a rearward end of the braking surfaces being held further outward away from the wheel sides than forward ends of the braking surfaces by the shim plates.

2. A gaping tool for use in setting toe-out angle of a pair of brake pads relative to an adjacent wheel of a bicycle intended to be stopped by the brake pads, comprising;

a first arm member and a second arm member;

pivotal connecting means attaching the first and second arm members to one another, said pivotal connecting means positioned away from a distal end of each of the arm members for allowing the distal ends of the arm members to be capable of being moved directionally toward and away from one another;

spring biasing means connecting between the first and second arm members for biasing the distal ends of the arm members toward one another;

a first shim plate pivotally connected on the distal end of said first arm member; said first shim plate having an inward facing surface for abutment against a first side of the bicycle wheel, said first shim plate further having an outward facing surface oppositely disposed from said inward facing surface for abutment against by a braking surface of a first brake pad of the pair of brake pads;

a second shim plate pivotally connected on the distal end of said second arm member; said second shim plate having an inward facing surface for abutment against a second side of the bicycle wheel oppositely disposed from said first side of the bicycle wheel, said second shim plate further having an outward facing surface oppositely disposed from said inward facing surface of said second shim plate for abutment against by a braking surface of a second brake pad of the pair of brake pads;

the first and second shim plates each extending outward from the respective supporting distal ends of the arm members and in generally the same direction as one another wherein the outward extension of the shim plates is generally perpendicular to the toward and away directional movement capabilities of the arm members;

the first and second shim plates each having a thickness defined between the inward and outward facing surfaces thereof sufficient for abutting the respective brake pads against the outward facing surfaces of the shim plates with the inward facing surfaces of the shim plates simultaneously against the respective opposite sides of the bicycle wheel wherein toe-out setting of the brake pads is made by a rearward end of the braking surfaces being held further outward away from the wheel sides than forward ends of the braking surfaces by the shim plates.

3. A gaping tool for use in setting toe-out angle of a brake pad relative to an adjacent wheel side of a bicycle, comprising;

a shim plate of firm material of a thickness between 1 and 6 millimeters between an inward facing surface and an outward facing surface thereof, at least one of the surfaces of said shim plate having a pressure sensitive tacky adhesive applied thereto for temporarily adhering the shim plate abutted between the wheel side and the brake pad and positioned so as to angle the brake pad to have a rearward end of the brake pad further from the wheel side than a front end of the brake pad and to thus provide the toe-out angle, said pressure sensitive tacky adhesive being of a sufficiently low tack nature as to allow for intentional removal of said shim plate from between the wheel side and the brake pad after securing the toe-out angle of the brake pad relative to the wheel side.

4. A gaping tool in accordance with claim 3 wherein said at least one of the surfaces of said shim plate having a pressure sensitive tacky adhesive applied thereto is covered with a removable peel-off film for protecting said adhesive prior to adhering said shim plate in position between the wheel side and brake pad.

* * * * *